United States Patent
Wolter

(10) Patent No.: US 8,188,675 B2
(45) Date of Patent: May 29, 2012

(54) METHOD FOR OPERATING AN ILLUMINATION SYSTEM WITH SEQUENTIAL COLOR FILTERING AND A HIGH PRESSURE DISCHARGE LAMP

(75) Inventor: Kai Wolter, Berlin (DE)

(73) Assignee: Osram AG, Munich (DE)

( * ) Notice: Subject to any disclaimer, the term of this patent is extended or adjusted under 35 U.S.C. 154(b) by 647 days.

(21) Appl. No.: 12/309,449

(22) PCT Filed: Jul. 31, 2007

(86) PCT No.: PCT/EP2007/057863
§ 371 (c)(1),
(2), (4) Date: Jan. 15, 2009

(87) PCT Pub. No.: WO2008/015204
PCT Pub. Date: Feb. 7, 2008

(65) Prior Publication Data
US 2009/0195181 A1    Aug. 6, 2009

(30) Foreign Application Priority Data
Aug. 2, 2006 (DE) .......................... 10 2006 036 112

(51) Int. Cl.
*G05F 1/00* (2006.01)
(52) U.S. Cl. .......................... 315/291; 315/302; 315/307
(58) Field of Classification Search .................. 315/291, 315/294, 297, 302, 307, 308
See application file for complete search history.

(56) References Cited

U.S. PATENT DOCUMENTS

| 5,706,061 A | 1/1998 | Marshall et al. |
| 7,285,920 B2 | 10/2007 | Riederer et al. |
| 2006/0038809 A1 | 2/2006 | Kuo et al. |

FOREIGN PATENT DOCUMENTS

| EP | 1 631 092 A2 | 1/2006 |
| EP | 1 631 092 A3 | 1/2006 |
| WO | WO 03/096760 A1 | 11/2003 |
| WO | WO 2005/120138 A1 | 12/2005 |
| WO | WO 2006/056926 A1 | 6/2006 |

*Primary Examiner* — Douglas W Owens
*Assistant Examiner* — Jianzi Chen
(74) *Attorney, Agent, or Firm* — Holtz, Holtz, Goodman & Chick, PC

(57) ABSTRACT

The present invention relates to a method for operating an illumination system, which illumination system has a high pressure discharge lamp driven with a commutating lamp current (IL), and a color filter system for filtering the light of the high pressure discharge lamp in a plurality of sequential color segments (A, B, D, E, G, H). The invention further relates to an illumination system for embodying the inventive method, and to a computer program product which can be loaded into an inventive illumination system in order to configure said illumination system in accordance with the inventive method. According to the invention, prior to a commutation in an intermediate phase (ZP), the lamp current (IL) passes through an intermediate phase pulse (DP), during which the light of the illumination system is suppressed. When a change occurs in the course of the lamp current preceding the intermediate phase (ZP), the intermediate phase pulse (DP) occurring in the intermediate phase is adapted in such a way that the change is at least partially compensated in the effect thereof on the electrode temperature at the time of the commutation.

9 Claims, 3 Drawing Sheets

METHOD FOR OPERATING AN ILLUMINATION SYSTEM WITH SEQUENTIAL COLOR FILTERING AND A HIGH PRESSURE DISCHARGE LAMP

This application is a U.S. National Phase Application under 35 USC 371 of International Application PCT/EP2007/057863, filed Jul. 31, 2007, which is incorporated herein in its entirety by this reference.

TECHNICAL FIELD

The present invention relates to a method for operating an illumination system which has a high-pressure discharge lamp operated with a commutating lamp current and a color filter system for filtering the light of the high-pressure discharge lamp in a plurality of color segments which are sequential in time. Furthermore, the invention relates to an illumination system which is designed for carrying out the method according to the invention. Finally, the invention also relates to a computer program product for loading into an illumination system in order to program the latter in accordance with the method according to the invention.

PRIOR ART

Illumination systems with a high-pressure discharge lamp and a color filter system for filtering the light are known per se. Such illumination systems are usually used for projection.

The operation of the color filter system and the commutations of the current in the high-pressure discharge lamp are jointly clocked. As a rule, each half wave of the lamp current contains a number of color segments.

The color filter system of the illumination system is arranged in such a manner that it filters the light of the lamp sequentially in time, using a plurality of color filters, at least three color filters as a rule. As a rule, the sequential filtering in time is periodic, the sequence of the different colors remaining the same. Such color filter systems are used especially in conjunction with electronic mirror systems in order to be able to create pictures with colors composed of the colors of the filter system in different phases by different electronic control of the mirrors. This makes use of the fact that when the sequence of individual colors is sufficiently fast, a mixed color impression is produced in the human eye.

As a rule, color filter systems in projection systems have a mechanical structure in the form of a wheel rotating about an axis, which wheel consists of filter segments, the light of the lamp being filtered by the rotating wheel and resulting in the sequential sequence in time due to the rotation of the different segments through the light beam. For this reason, they are also frequently called color wheels in this technical field. However, the invention is not restricted to such mechanical solutions but can also be implemented with any other color filter systems which are sequential in time.

The light emitted by the high-pressure discharge lamp is usually suppressed in intermediate phases between the color segments of the color filtering. Such intermediate phases can be used for blocking out the light of the lamp in the times in which it is filtered not only by one, but by two color filters because of the diameter of the light beam. This is usually done by tilting electronically controlled mirrors. These intermediate phases are also called spokes. As a rule, such intermediate phases also cover the commutations or the ends of the half waves preceding the commutation. In the context of the invention, only intermediate phases at the end of the commutation half waves will be initially considered but this should not exclude the use of other intermediate phases (see below).

To stabilize the discharge in the high-pressure discharge lamp, it is known to increase the lamp current for a short time at the end of each half wave of the lamp current, that is to say before a commutation. Such lamp current pulses increase the electrode temperature and thus stabilize the discharge (maintenance pulse). This is important, particularly for the electrode which acts as cathode after the commutation.

If the illumination system emits light with a different color temperature, it is conventionally necessary to exchange the color wheel, putting up with an interruption of the operation, and possibly to readjust the illumination system with respect to the synchronization of color segments and possibly commutations.

During the operation of the illumination system, the color temperature can also be adjusted by temporarily blocking out the color-filtered light. For this purpose, an abovementioned electronic mirror system can be used which adjusts the color temperature as desired by means of different electronic control of the mirrors in different phases.

DESCRIPTION OF THE INVENTION

The invention is based on the technical problem of specifying an improved method for operating an illumination system with a color filter system and with a high-pressure discharge lamp.

The invention is related to a method for operating an illumination system, comprising the steps: operating a high-pressure discharge lamp with a commutating lamp current, wherein an intermediate phase during which the light of the high-pressure discharge lamp is suppressed occurs at least at the end of the commutation half waves, and filtering the light of the high-pressure discharge lamp in a plurality of sequential color segments in time within the commutation half waves with a color filter system, in which method the lamp current, within one of the intermediate phases at the end of one of the commutation half waves, passes through an intermediate-phase pulse with a lamp current which is increased in comparison with the mean value of the lamp current variation preceding the intermediate phase in this commutation half wave, and furthermore comprising the steps: changing the lamp current variation of this half wave preceding the intermediate phase in comparison with the immediately preceding half wave of the same polarity so that the light emitted by the illumination system assumes the desired color temperature, and changing the duration and/or amplitude of the intermediate-phase pulse of this half wave so that the discharge is stabilized, wherein the change in the effect of the intermediate-phase pulse on the electrode temperature at the time of the following commutation and the change in the effect of the lamp current variation preceding the intermediate phase on the electrode temperature at least partially compensate for one another at the time of the following commutation.

Furthermore, the invention is directed to a correspondingly designed illumination system and to a computer program product for loading into an illumination system.

Preferred embodiments are specified in the dependent claims. In this context, the features of the claims and the features disclosed in the description are to be understood in each case both with regard to the method and to the illumination system and the computer program product without a further express distinction being made between these in detail.

The invention is based on the fact that a change of the lamp current in the color segments leads to a change of the color temperature of the light emitted by the illumination system. The inventors have found that such a change also affects the electrode temperature.

Above all, the electrode temperature should not be too low but must also not be too great. If the electrode temperature is too low, particularly at the time of the commutation, this can have a negative effect on the stability of the discharge; if the electrode temperature is too great, the electrodes can display pathological changes and can even grow together uncontrolled. If the high-pressure discharge lamp is operated with a suitable electrode temperature, it is naturally desirable if the electrode temperature remains suitable from commutation to commutation even if the lamp current variation changes within the half wave.

In the invention, too, a so called maintenance pulse is used at the end of a half wave in order to stabilize the discharge. The invention is also based on the fact that such a maintenance pulse only influences the electrode temperature and not the color temperature if it is located in an intermediate phase. A maintenance pulse located in an intermediate phase is called an intermediate-phase pulse here. Due to the position of the pulse, naturally, this means the intermediate phases at the ends of the commutation half waves.

The concept of the invention is to balance out the effect of the lamp current during the color segments of a half wave and the effect of the intermediate-phase pulse of the same half wave on the electrode temperature at the time of the commutation following the half wave against one another in such a manner that the discharge is stabilized even if the color temperature is changed; that is to say the electrode temperature becomes not too low and not too great and also remains suitable especially with a change of the color temperature during the operation of the illumination system.

For a particular time interval of the lamp current from the next commutation, the greater the amplitude of the lamp current and the longer the increased amplitude lasts the more the lamp current contributes to the electrode temperature during this commutation. This contribution becomes less with an increasing time interval.

According to the invention, a change of the amplitude of the lamp current in the color segments is compensated for by a change of the lamp current in the intermediate phase, that is to say by a change of the duration of the intermediate-phase pulse or by a change of its amplitude or by both.

To provide a better understanding, the possibilities of the invention will be discussed already at this point by means of two possible operating modes of an illumination system according to the invention:

1. If, for example, the last color segment before the intermediate phase at the end of the half wave always corresponds to the same color and if the color temperature is to be adjusted by changing the light intensity of this color, the lamp current amplitude can be adjusted for this purpose in this color segment. To keep the electrode temperature suitable at the time of the commutation, the amplitude of the intermediate-phase pulse can be adjusted in the opposite sense during the intermediate phase.
2. However, color filter systems are often operated differently in that the last color segment before the intermediate phase does not always have to correspond to the same color. The required light intensity and thus the lamp current to be used in this color segment correspondingly changes from half wave to half wave of the same polarity. In this case, the invention allows sticking to a particular color temperature or naturally also readjusting it while simultaneously keeping the electrode temperature at the time of commutation. This is because, in this case, too, the result can be achieved by balancing out the effect of the intermediate-phase pulse against the effect of the lamp current preceding the intermediate phase.

Important embodiments of the invention exhibit large lamp currents in the last color segments, or only the last color segment, before the commutation. A total pulse comprising one to several color segments can form which comprises the intermediate-phase pulse which is why such a lamp current pulse will be called total pulse from now on. Such a total pulse is defined as follows: during the total pulse, the lamp current is increased in comparison with the absolute value average over the entire half wave. The total pulse begins in the second half of the half wave, frequently only towards its end, and ends with the commutation. In this case, the rear part of the total pulse is located in the intermediate phase at the end of the respective half wave (and comprises the intermediate-phase pulse). The lamp current variation typically corresponds to a square-wave current or to a rounded (low-pass-filtered) square-wave current.

A first part of the total pulse is thus located before the intermediate phase and the second part is formed by the lamp current within the intermediate phase. The desired color temperature of the light emitted by the illumination system is preferably adjusted by changing the duration and/or amplitude of the first part of the total pulse in comparison with the total pulse of the immediately preceding half wave of the same polarity. In this context, the lamp current is changed for the second part of the total pulse of the same half wave, that is to say the amplitude of the lamp current is adapted in the intermediate phase, in such a manner that the electrode temperature assumes a suitable value at the time of the commutation. As a rule, the duration of the second part of the total pulse will not be changed since the duration of the second part of the total pulse corresponds to the duration of the intermediate phase. However, changing the duration of the intermediate phase is not excluded. Overall, the effect of the second part of the total pulse on the electrode temperature should compensate at least partially for the corresponding effect of the first part.

In this case, correction is made especially for the amplitude of the two parts of the total pulse but this does not mean that in each case only one amplitude value can be necessarily allocated to the two parts. It is thus possible, for example, that the parts of the total pulse consist of several rectangular sections having in each case a different amplitude. The "change of amplitude" should also comprise, for example, the change of amplitude of only one such rectangle but also of several such rectangles.

As already mentioned above, the contribution of the lamp current to the electrode temperature at the time of commutation decreases with increasing time interval. Depending on the extent of the total pulse in time, this time dependence in the total pulse can be neglected as a more or less rough approximation. With such an approach, it makes sense to use the integral over the total pulse as a measure of the effect of the total pulse on the electrode temperature. The greater this integral over the total pulse, the more the total pulse contributes to the electrode temperature at the time of commutation. For the sake of linguistic simplicity, the integral over the total pulse will be called pulse intensity from now on.

The following intervals have been found to be successful for the mean (total) pulse height, the (total) pulse length and the pulse intensity: referred to the absolute value average of the lamp current during one half wave (100%), the preferred mean pulse height is 110-200%. The range between 120-

170% is even more suitable. Suitable pulse lengths are specified with reference to the half wave duration (100%). The pulse length preferably corresponds to 6-35% of the half wave duration. A pulse length of 7-8% with a mean pulse height of 150-170% and a pulse length of 14-16% with 130-140% pulse height is especially preferred.

If the pulse intensity is quantified as a product of the mean pulse increase (pulse height in percent minus 100%) and the pulse length (in percent), the preferred range lies between 250 and 700; the interval between 300 and 550 is even more preferred.

To balance out the variation of the lamp current in the first and second part of the total pulse, correction is preferably carried out for the integral over the total pulse. The above-mentioned at least partial compensation of the change of the effect of the parts of the total pulse on the electrode temperature is to be achieved in such a manner that the pulse intensity, or the integral over the total pulse, respectively, does not fluctuate too much from half wave to half wave of the same polarity even if the first part of the total pulse is changed, namely by a maximum of up to 20%, more preferred by maximally 10% even more preferred by maximally 5%. In the most advantageous case, the electrode temperature can thus be adjusted to be essentially constant for a polarity at the time of commutation.

It is preferred to assemble the total pulses from rectangular pulses. Since, above all, the electrode temperature should not be too low, it is also preferred to form a rising stepped total pulse shape from such rectangular pulses. In this arrangement, the last step lies in the intermediate phase. This is especially preferred because—as can be seen from the motivation of the term pulse intensity above—it is a matter not only of the pulse intensity but also of the time interval to the commutation in the actual unapproximated effect of the lamp current on the electrode temperature.

In the simplest, and therefore also preferred case, the total pulse corresponds to a rising double step (dual pulse), the second step being located in the intermediate phase. However, this does not mean that the duration of the last step must be identical with the duration of the intermediate phase even if this is particularly advantageous since the duration of the intermediate phase can thus be used optimally for heating the electrode.

It is also preferred that the duration of the total pulse corresponds to the duration of the intermediate phase plus the duration of the color segment preceding this intermediate phase. The total pulse thus takes up the period from the beginning of the last color segment to the end of the half wave. This is particularly preferred since the color filter systems normally used in each case expect a change in lamp current only at the boundaries of the color segments.

To keep the electrode temperature sufficiently high during the entire operation, it is preferred that the lamp current passes through a total pulse before each commutation. This applies to both polarities of the lamp current. It is particularly preferred if the lamp current of the two parts of the total pulses is adjusted in accordance with the method according to the invention for both polarities.

The effect of the lamp current on the electrode temperature can be quite different for both polarities. The consequence is that one of the two electrodes of the lamp is heated more poorly. Such a difference can extend to a window which is limited in time, for instance over a few commutations, but can also be permanent. Additional total pulses can be used and adjusted according to the invention especially for the polarity heated less effectively.

In a simple case, each half wave of the polarity heated less effectively per se then exhibits a total pulse adjusted in accordance with the invention.

As an alternative or supplementary to an adjustment of the color temperature over the mean amplitude of the lamp current in a color segment, the color temperature is varied by short phases having a low lamp current, called negative pulses from now on. It takes a little time until the light flux decrease is noticeable as a consequence of a reduced lamp current so that such a negative pulse should have a minimum duration in order to have an affect on the color temperature. On the other hand, such a negative pulse must also not be too long since otherwise the electrode temperature drops too much. A negative pulse lasts between 0.15 and 0.25 ms, the lamp current being reduced by 5-70% with respect to the mean value over the half wave during the negative pulse.

If too many such negative pulses are used, this naturally also has a negative effect on the electrode temperature. It is also therefore preferred to use only up to 12 such negative pulses in one half wave. It is more preferred to use only up to three negative pulses. If a color segment appears several times within one half wave, it has been found to be successful to place a negative pulse into the color segment only for each second pass through the latter.

With respect to the computer program product aspect of the invention, it must be noted that today illumination systems are frequently controlled digitally.

For this purpose, an illumination system usually contains a programmable control unit which can control the illumination system in accordance with the method according to the invention with the aid of a corresponding computer program product.

BRIEF DESCRIPTION OF THE DRAWINGS

In the text which follows, the invention will be explained in greater detail with reference to actual examples, the features disclosed therein being of significance, on the one hand, both for the character of the method and for the character of the device of the invention and can also be essential to the invention in other combinations.

PREFERRED EMBODIMENT OF THE INVENTION

Figure 1:
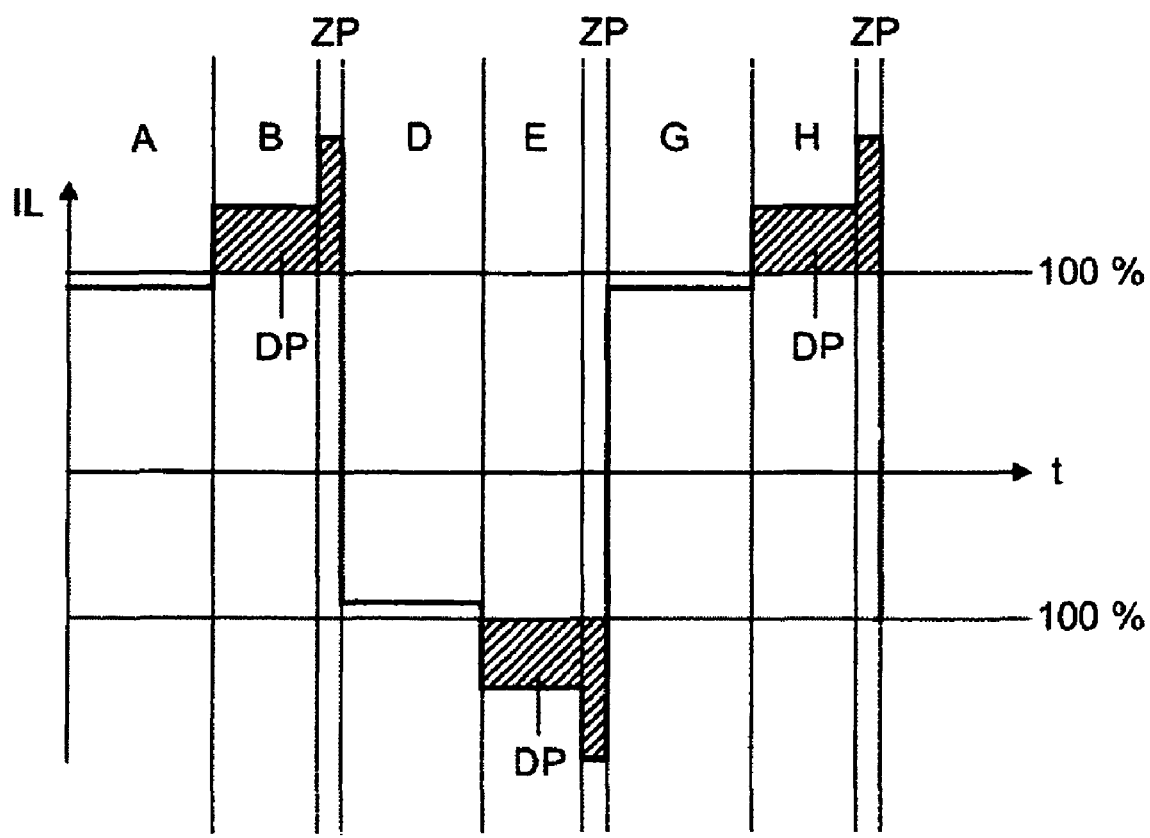
FIG. 1 shows a lamp current variation for a first exemplary embodiment of the invention.

FIG. 1 shows a commutating lamp current IL in a high-pressure discharge lamp of a projection system which is operated in accordance with the invention. The projection system (not shown) operates with a frame repetition rate of 50 Hz (or 60 Hz for the US). It is designed in such a way that the lamp current IL can commutate two to five times per repeated frame. In the present example, the lamp current commutates three times per frame. The direct-current component is zero.

The lamp current IL is plotted as a function of time t. The lamp current for the respective polarities, averaged over some color segments, is specified in each case with 100% on the right in the diagram. Three half waves can be seen. The shaded area in the second half of each half wave marks the part of a dual pulse DP exceeding the average lamp current per half wave. The second step of each of these dual pulses DP is located in an intermediate phase ZP. During these intermediate phases ZP, the light of the high-pressure discharge lamp is not used for projection by the projection system. It is then deflected via tiltable mirrors (only intermediate phases at the end of half waves are drawn in). The first parts or the first steps of the dual pulses DP in each case are located within the sections B, E, H which in the present case correspond to the duration of the application of a color filter, that is to say one color segment. Sections A, D, G in each case correspond to further color segments.

The first step of the dual pulses DP is adjusted during times B, E, H in such a manner that the color temperature of the light emitted by the projection system corresponds to the desired color temperature; the second step of the dual pulses DP is correspondingly adjusted in the intermediate phases ZP so that a suitable electrode temperature is provided for.

If the lamp current is reduced for one of the color segments B, E, H, the respective associated second step of the dual pulses DP can be increased during the corresponding intermediate phase ZP. Naturally, the inverse correspondingly applies for an increase in the lamp current in one of the color segments B, E, H.

In principle, the lamp currents can also be of different magnitude during the phases B, E and H. This is usually the case if the last color segment B, E, H of a half wave in each case corresponds to a different color. In order to ensure under these circumstances an essentially constant electrode temperature for the times of commutation, the height of the second step is correspondingly adapted during the intermediate phases ZP.

Figure 2:
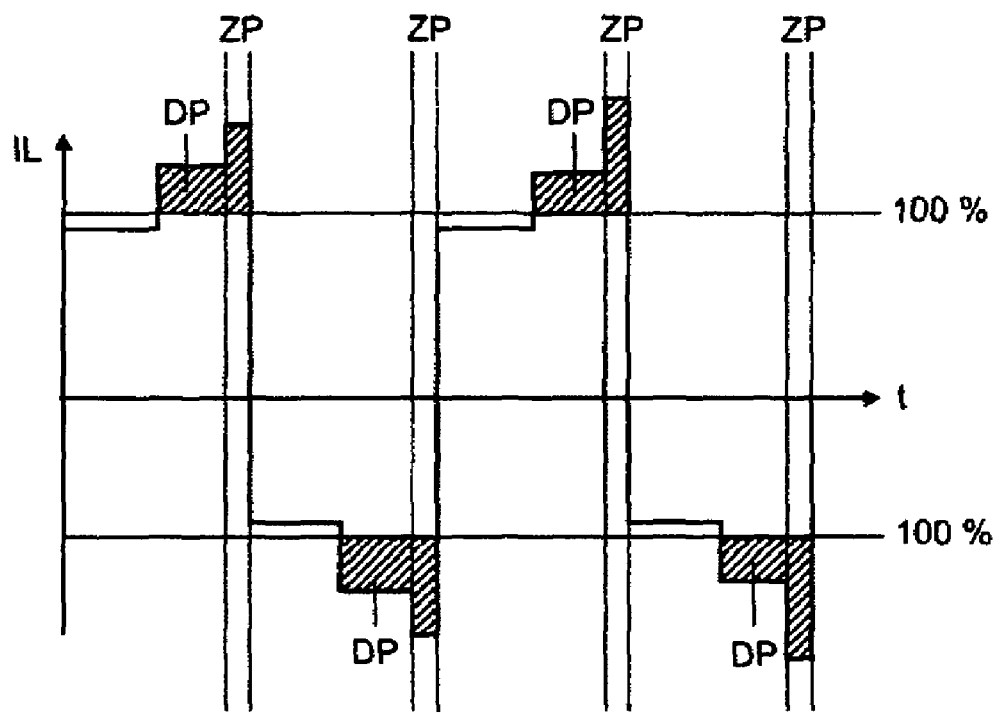
FIG. 2 shows a lamp current variation for a second exemplary embodiment of the invention.

FIG. 2 shows an exemplary adaptation of the second part of a dual pulse DP to a change of the first part of a dual pulse DP. Four half waves with dual pulses DP are shown. In the case of the right-hand two half waves, the lamp current amplitude is lowered in comparison with the first two dual pulses DP during the first part of the dual pulses DP. To keep the electrode temperature essentially constant at the time of commutation, the second part of the dual pulses DP is increased in the right-hand two dual pulses DP. The shaded area which specifies the area above the mean lamp current within each half wave has remained constant.

Figure 3:
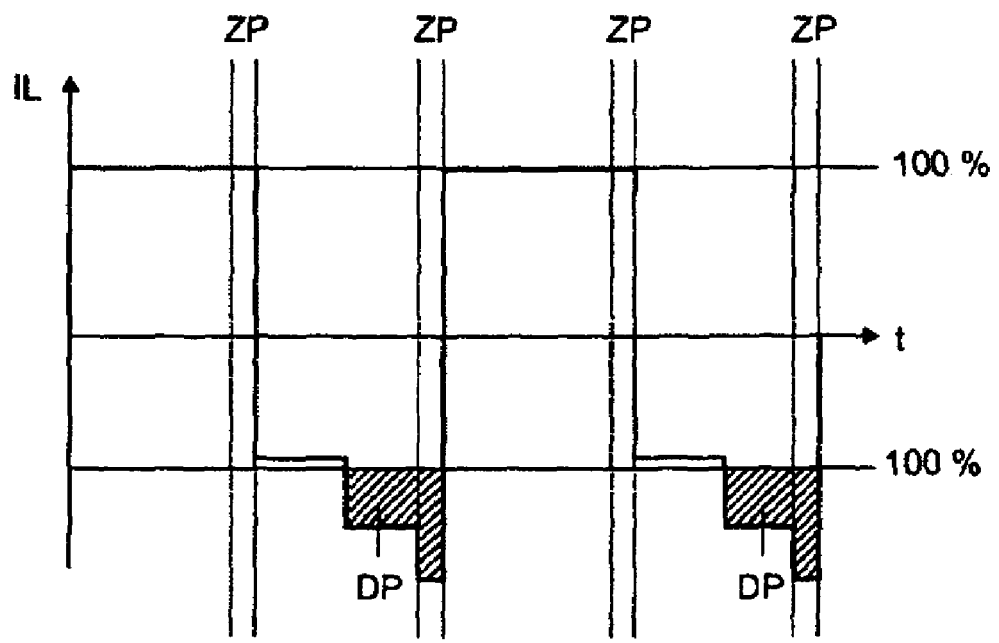
FIG. 3 shows a further lamp current variation for a third exemplary embodiment of the invention.

FIG. 3 again shows four half waves of the lamp current. The two half waves of positive polarity (positive lamp current) do not have a total pulse or an intermediate-phase pulse before the commutation. The two half waves of negative polarity in each case have a dual pulse DP. The lamp current IL here heats the two electrodes with different effectiveness for the two polarities. In this case, the discharge following the half waves of positive polarity is already adequately stabilized even without a total pulse or intermediate-phase pulse. In the case of the half waves of negative polarity, dual pulses DP are used for adequately stabilizing the discharge.

Figure 4:
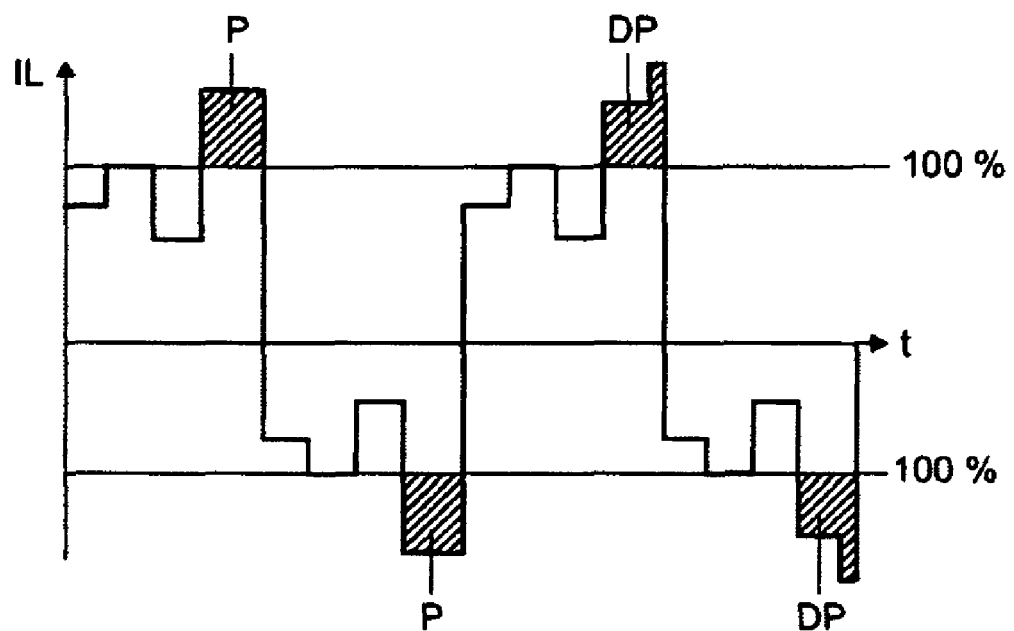
FIG. 4 shows a lamp current variation for a fourth exemplary embodiment of the invention.

Color wheels can have up to six different colors and they can rotate up to four times per half wave (in the case of 50 Hz frame repetition rate and three commutations per frame). Correspondingly, up to 24 color segments per half wave are obtained. FIG. 4 shows diagrammatically how a different lamp current is selected for different color segments (for the sake of clarity, only four color segments each are shown, however, intermediate phases at the end of the commutations have not been drawn in especially).

FIG. 4 also shows four half waves, the right-hand two half waves having one dual pulse DP each. In the case of the left-hand two half waves, the adjustment of the respective first and second part of the total pulse P has led to these being by chance of the same height.

The amplitude of the lamp current within the individual color segments fluctuates between 70% and 130% of the mean lamp current of the same half wave. A choice from the interval of 85% to 115% has also been found to be successful.

Figure 5:
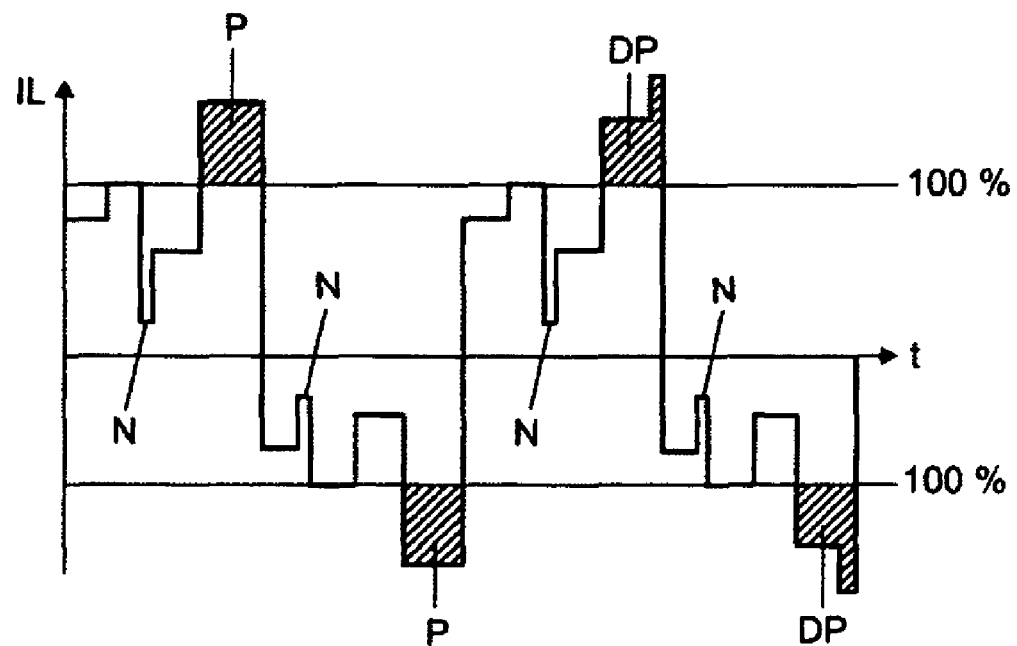
FIG. 5 shows a lamp current variation for a concluding fifth exemplary embodiment of the invention.

FIG. 5 shows the lamp current variation from FIG. 4 supplemented by one negative pulse per half wave in each case. The negative pulses are here 0.2 ms long, the light intensity drops by more than 25% within this time. At its minimum, the lamp current corresponds to 30% of the mean lamp current of the respective half wave.

The dimensions of the total pulses in FIGS. 1 to 5 are not to scale. Total pulses having a length of 7.5% with a mean pulse height of 160% (pulse intensity: 450) and total pulses having a length of 15% at a mean pulse height of 135% (pulse intensity 525) have been found to be successful.

The invention claimed is:

1. A method for operating an illumination system comprising the steps:

operating a high-pressure discharge lamp with a commutating lamp current (IL), wherein an intermediate phase (ZP) during which the light of the high-pressure discharge lamp is suppressed occurs at least at the end of the commutation half waves, and filtering the light of the high-pressure discharge lamp in a plurality of sequential color segments (A, B, D, E, G, H) in time within the commutation half waves with a color filter system, in which method the lamp current, within one of the intermediate phases at the end of one of the commutation half waves, passes through an intermediate-phase pulse (DP) with a lamp current which is increased in comparison with the mean value of the lamp current variation preceding the intermediate phase in this commutation half wave, and furthermore comprising the steps:

changing the lamp current variation of this half wave preceding the intermediate phase in comparison with the immediately preceding half wave of the same polarity so that the light emitted by the illumination system assumes the desired color temperature, and changing the duration and/or amplitude of the intermediate-phase pulse (DP) of this half wave so that the discharge is stabilized, wherein the change in the effect of the intermediate-phase pulse on the electrode temperature at the time of the following commutation and the change in the effect of the lamp current variation preceding the intermediate phase on the electrode temperature at least partially compensate for one another at the time of the following commutation; and in which the lamp current of one of the half waves, before the commutation, passes through a total pulse (DP) which also comprises the intermediate-phase pulse with a lamp current (IL) which is increased in comparison with the mean value of the lamp current variation of the half wave preceding the intermediate phase, wherein a first part of the total pulse lies before the intermediate phase (ZP) and a second part lies within it and the method comprises the steps:

changing the duration and/or amplitude of the first part of the total pulse (DP) in comparison with the total pulse (DP) of the immediately preceding half wave of the same polarity so that the light emitted by the illumination system assumes the desired color temperature, changing the lamp current (IL) during the second part of the total pulse (DP) of this half wave so that the discharge is stabilized, wherein the change in the effect of the second part of the total pulse (DP) on the electrode temperature at the time of the following commutation and the change in the effect of the first part of the total pulse (DP) on the electrode temperature at the time of the following commutation at least partially compensate for one another; and in which a change of the adjustment of the duration and/or amplitude of the first part of the total pulse (DP) of this half wave in comparison with a total pulse (DP) of the immediately preceding half wave of the same polarity is compensated for by a change of the lamp current (IL) during the second part of the current total pulse (DP) in such a manner that the integral over the total pulse (DP) of this half wave in comparison with the total pulse (DP) of the preceding half wave of the same polarity deviates maximally by up to 20%.

2. The method as claimed in claim 1, in which the total pulse (DP) passes through a shape rising in steps and the last step lies in the intermediate phase (ZP).

3. The method as claimed in claim 2 in which the total pulse (DP) corresponds to a double step (DP) in which the first step corresponds to the first component and the second step corresponds to the second component of the total pulse (DP).

4. The method as claimed in claim 1 in which the total pulse (DP) consists of the lamp current variation during the intermediate phase (ZP) and during the color segment (B, E, H) immediately preceding the intermediate phase (ZP).

5. The method as claimed in claim 1 in which the lamp current (IL) passes through a total pulse (DP) before each commutation and for both polarities, the lamp current (IL) of the first and of the second part of one of the total pulses (DP) is adjusted separately for the two parts so that the light emitted by the illumination system assumes the desired color temperature and the discharge is stabilized.

6. The method as claimed in claim 1 in which the lamp current (IL) in each case passes through a total pulse (DP) only for the half waves of the one of the two polarities within a time window comprising several commutations and the lamp current (IL) of the first and of the second part of one of the total pulses (DP) is adjusted separately for the two parts for this polarity so that the light emitted by the illumination system assumes the desired color temperature and the discharge is stabilized.

7. The method as claimed in claim 1 in which the lamp current (IL), in a half wave before the intermediate phase (ZP), is reduced for 0.15-0.25 ms over 5-70% referred to the mean value of the half wave before the intermediate phase (ZP).

8. The method as claimed in claim 7 wherein said reductions are carried out in the same half wave before the intermediate phase (ZP).

9. An illumination system comprising a high-pressure discharge lamp to be operated via a commutating lamp current (IL), in which lamp, during the operation, an intermediate phase (ZP) during which the light of the high-pressure discharge lamp is suppressed occurs at least at the end of the commutation half waves, and a color filter system for filtering the light of the high-pressure discharge lamp in a plurality of sequential color segments (A, B, D, E, G, H) in time within a commutation half wave, wherein the illumination system is designed in such a manner that the lamp current (IL), within one of the intermediate phases (ZP) at the end of one of the commutation half waves, exhibits an intermediate-phase pulse (DP) with a lamp current which is increased in comparison with the mean value of the lamp current variation in this commutation half wave preceding the intermediate phase, the emitted light has the desired color temperature in response to a change of the lamp current variation of this half wave preceding the intermediate phase (ZP) in comparison with the immediately preceding half wave of the same polarity, and the discharge is stabilized by changing the duration and/or amplitude of the intermediate-phase pulse (DP) of this half wave, wherein the change in the effect of the intermediate-phase pulse (DP) on the electrode temperature at the time of the following commutation and the change in the effect of the lamp current variation on the electrode temperature preceding the intermediate phase at the time of the following commutation at least partially compensate for one another; and in which the lamp current of one of the half waves, before the commutation, passes through a total pulse (DP) which also comprises the intermediate-phase pulse with a lamp current (IL) which is increased in comparison with the mean value of the lamp current variation of the half wave preceding the intermediate phase, wherein a first part of the total pulse lies before the intermediate phase (ZP) and a second part lies within it and the method comprises the steps:

changing the duration and/or amplitude of the first part of the total pulse (DP) in comparison with the total pulse (DP) of the immediately preceding half wave of the same polarity so that the light emitted by the illumination system assumes the desired color temperature, changing the lamp current (IL) during the second part of the total pulse (DP) of this half wave so that the discharge is stabilized, wherein the change in the effect of the second part of the total pulse (DP) on the electrode temperature at the time of the following commutation and the change in the effect of the first part of the total pulse (DP) on the electrode temperature at the time of the following commutation at least partially compensate for one another; and in which a change of the adjustment of the duration and/or amplitude of the first part of the total pulse (DP) of this half wave in comparison with a total pulse (DP) of the immediately preceding half wave of the same polarity is compensated for by a change of the lamp current (IL) during the second part of the current total pulse (DP) in such a manner that the integral over the total pulse (DP) of this half wave in comparison with the total pulse (DP) of the preceding half wave of the same polarity deviates maximally by up to 20%.

* * * * *